| United States Patent [19] | [11] Patent Number: 4,701,519 |
| Evans et al. | [45] Date of Patent: Oct. 20, 1987 |

[54] METHOD FOR POLYMERIZING CYCLIC POLYCARBONATE OLIGOMERS WITH CATALYST COMPRISING POLYMER CONTAINING ALKALI METAL PHENOXIDE MOIETIES

[75] Inventors: Thomas L. Evans, Clifton Park; Carol B. Berman, Schenectady, both of N.Y.

[73] Assignee: General Electric Company, Schenectady, N.Y.

[21] Appl. No.: 941,901

[22] Filed: Dec. 15, 1986

[51] Int. Cl.[4] .................................................. C08G 63/62
[52] U.S. Cl. ................................... 528/371; 525/462; 528/196; 528/370
[58] Field of Search ................ 528/371, 370, 196; 525/462

[56] References Cited

U.S. PATENT DOCUMENTS

| 3,155,683 | 11/1964 | Moody | 528/371 |
| 4,605,731 | 8/1986 | Evans et al. | 528/371 |
| 4,644,053 | 2/1987 | Brunelle et al. | 528/371 |
| 4,650,852 | 3/1987 | Evans et al. | 528/371 |

*Primary Examiner*—Harold D. Anderson
*Attorney, Agent, or Firm*—William H. Pittman; James C. Davis, Jr.; James Magee, Jr.

[57] ABSTRACT

Cyclic polycarbonate oligomers are polymerized to linear polycarbonates by contact with a catalyst comprising a polymer containing alkali metal phenoxide moieties. Said polymer is preferably a polycarbonate and the alkali metal is preferably lithium. The catalyst polymer may be prepared by the reaction of a polymer with phenolic moieties with an alkali metal base such as lithium phenoxide at a temperature in the range of about 200°–300° C.

20 Claims, No Drawings

METHOD FOR POLYMERIZING CYCLIC POLYCARBONATE OLIGOMERS WITH CATALYST COMPRISING POLYMER CONTAINING ALKALI METAL PHENOXIDE MOIETIES

This invention relates to cyclic polycarbonate oligomers and methods for their polymerization.

The conversion of low molecular weight cyclic aromatic carbonate polymers to linear polycarbonates is known. Reference is made, for example, to the following U.S. patents:

| | |
|---|---|
| 3,155,683 | 3,386,954 |
| 3,274,214 | 3,422,119. |

More recently, cyclic polycarbonate oligomer mixtures have been prepared and converted to linear polycarbonates, often of very high molecular weight, by contact with various polycarbonate formation catalysts. Reference is made to U.S. Pat. No. 4,605,731, European Patent Application No. 162,379 and copending, commonly owned application Ser. No. 704,122, filed Feb. 22, 1985 now U.S. Pat. 4,644, 053 the disclosures of which are incorporated by reference herein. The polycarbonate formation catalysts disclosed as useful in said application include various bases and Lewis acids.

The conversion of cyclic polycarbonate oligomer mixtures to linear polycarbonates has high potential for utilization in reactive processing methods, such as pultrusion and rotational molding. One reason for this is the low melt viscosity of the oligomer mixtures at temperatures approaching that of polymerization, as a result of which handling thereof is simple, convenient and efficient.

A convenient property of the cyclic polycarbonate oligomers is their inertness to polymerization at low temperatures. Below about 200° C., they essentially do not polymerize at all. Therefore, it is frequently convenient to prepare blends of cyclics and polycarbonate formation catalyst by such means as co-dissolution in a common solvent such as methylene chloride, followed by solvent removal by vacuum stripping. The utility of such a procedure depends in large part on substantial solubility of the catalyst in the cyclics composition, which permits intimate blending therewith. Many relatively active catalysts, including alkali metal phenoxides, alkoxides and hydroxides, are not sufficiently soluble in cyclics for effective blending.

Another manipulative method, particularly useful in pultrusion, is to coat the catalyst on a continuous fiber reinforcing material. The fibers can then be drawn through a liquid resin precursor and subsequently heated to polymerization temperatures, whereupon catalyst activity is initiated and polymerization occurs on the surface of the fibers.

A very active class of catalysts which is disclosed in the aforementioned U.S. Pat. No. 4,605,731 includes various tetraarylborates, particularly tetraalkylammonium tetraphenylborates. The catalysts within this class are frequently not suitable for use in reactive processing methods such as pultrusion, since they are capable of initiating polymerization at temperatures lower then those required to achieve high flow in the cyclics compositions. Moreover, they tend to lose stability under typical pultrusion conditions.

The present invention employs a series of catalyst materials which have somewhat lower activity then the tetraarylborates but which are still active enough to efficiently polymerize cyclics compositions under reactive processing conditions. Moreover, catalysts within this class are soluble in the cyclics compositions and also in readily available solvents therefor, and thus may be easily and uniformly dispersed in such compositions. They are also easily coated on fibers and maintain high catalytic activity at pultrusion temperatures.

According to the present invention, resinous compositions are prepared by contacting, at a temperature in the range of about 200-350° C., at least one cyclic polycarbonate oligomer with a catalyst comprising a polymer containing alkali metal phenoxide moieties.

The cyclic polycarbonate oligomers useful in the present invention generally comprise structural units having the formula

wherein at least about 60% of the total number of R values are aromatic organic radicals and the balance thereof are aliphatic, alicyclic or aromatic organic radicals. The aliphatic or alicyclic R values generally contain up to about 8 carbon atoms. The R values may contain substituents such as halo, nitro, alkoxy, lactone and the like. Most often, however, all R radicals are hydrocarbon radicals.

Preferably at least about 80% of the total number of R values in the cyclic oligomer mixtures, and most desirably all of said R values, are aromatic. The aromatic R radicals preferably have the formula

each of $A^1$ and $A^2$ is a monocyclic divalent aromatic radical and Y is a bridging radical in which one or two carbon atoms separate $A^1$ from $A^2$. The free valence bonds in formula II are usually in the meta or para positions of $A^1$ and $A^2$ in relation to Y.

In formula II, the $A^1$ and $A^2$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred. Both $A^1$ and $A^2$ are preferably p-phenylene, although both may be o- or m-phenylene or one o- or m-phenylene and the other p-phenylene.

The bridging radical, Y, is one in which one or two atoms, preferably one, separate $A^1$ from $A^2$. It is most often a hydrocarbon radical and particularly a saturated radical such as methylene, cyclohexylmethylene, 2-[2.2.1]bicycloheptylmethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone.

The R values may be considered as being derived from dihydroxy compounds of the formula

especially dihydroxyaromatic compounds and preferably bisphenols of the formula HO—$A^1$—Y—$A^2$—OH. The following dihydroxy compounds are illustrative:
Ethylene glycol
Propylene glycol
1,3-Propanediol
1,4-Butanediol
1,6-Hexanediol
1,12-Dodecanediol
2-Ethyl-1,10-decanediol
2-Butene-1,4-diol
1,3-Cyclopentanediol
1,3-Cyclohexanediol
1,4-Cyclohexanediol
1,4-Bis(hydroxymethyl)benzene (which is a vinylog of ethylene glycol and has similar properties)
Resorcinol
4-Bromoresorcinol
Hydroquinone
4,4'-Dihydroxybiphenyl
1,6-Dihydroxynaphthalene
2,6-Dihydroxynaphthalene
Bis(4-hydroxyphenyl)methane
Bis(4-hydroxyphenyl)diphenylmethane
Bis(4-hydroxyphenyl)-1-naphthylmethane
1,1-Bis(4-hydroxyphenyl)ethane
1,2-Bis(4-hydroxyphenyl)ethane
1,1-Bis(4-hydroxyphenyl)-1-phenylethane
2,2-Bis(4-hydroxyphenyl)propane ("bisphenol A")
2-(4-Hydroxyphenyl)-2-(3-hydroxyphenyl) propane
2,2-Bis(4-hydroxyphenyl)butane
1,1-Bis(4-hydroxyphenyl)isobutane
1,1-Bis(4-hydroxyphenyl)cyclohexane
1,1-Bis(4-hydroxyphenyl)cyclododecane
Trans-2,3-bis(4-hydroxyphenyl)-2-butene
2,2-Bis(4-hydroxyphenyl)adamantane
α,α'-Bis(4-hydroxyphenyl)toluene
Bis(4-hydroxyphenyl)acetonitrile
2,2-Bis(3-methyl-4-hydroxyphenyl)propane
2,2-Bis(3-ethyl-4-hydroxyphenyl)propane
2,2-Bis(3-n-propyl-4-hydroxyphenyl)propane
2,2-Bis(3-isopropyl-4-hydroxyphenyl)propane
2,2-Bis(3-sec-butyl-4-hydroxyphenyl)propane
2,2-Bis(3-t-butyl-4-hydroxyphenyl)propane
2,2-Bis(3-cyclohexyl-4-hydroxyphenyl)propane
2,2-Bis(3-allyl-4-hydroxyphenyl)propane
2,2-Bis(3-methoxy-4-hydroxyphenyl)propane
2,2-Bis(3,5-dimethyl-4-hydroxyphenyl)propane
2,2-Bis(2,3,5,6-tetramethyl-4-hydroxyphenyl)propane
2,2-Bis(3-5-dichloro-4-hydroxyphenyl)propane
2,2-Bis(3,5-dibromo-4-hydroxyphenyl)propane
2,2-Bis(2,6-dibromo-3,5-dimethyl-4-hydroxyphenyl)propane
α,α-Bis(4-hydroxyphenyl)toluene
α,α,α',α'-Tetramethyl-α,α'-bis(4-hydroxyphenyl)-p-xylene
2,2-Bis(4-hydroxyphenyl)hexafluoropropane
1,1-Dichloro-2,2-bis(4-hydroxyphenyl)ethylene
1,1-Dibromo-2,2-bis(4-hydroxyphenyl)ethylene
1,1-Dichloro-2,2-bis(5-phenoxy-4-hydroxyphenyl)ethylene
4,4'-Dihydroxybenzophenone
3,3-Bis(4-hydroxyphenyl)-2-butanone
1,6-Bis(4-hydroxyphenyl)-1,6-hexanedione
Bis(4-hydroxyphenyl) ether
Bis(4-hydroxyphenyl) sulfide
Bis(4-hydroxyphenyl) sulfoxide
Bis(4-hydroxyphenyl) sulfone
Bis(3,5-dimethyl-4-hydroxyphenyl) sulfone
9,9-Bis(4-hydroxyphenyl)fluorene
2,7-Dihydroxypyrene
6,6'-Dihydroxy-3,3,3',3'-tetramethylspiro(bis)indane ("spirobiindane bisphenol")
3,3-Bis(4-hydroxyphenyl)phthalide
2,6-Dihydroxydibenzo-p-dioxin
2,6-Dihydroxythianthrene
2,7-Dihydroxyphenoxathiin
2,7-Dihydroxy-9,10-dimethylphenazine
3,6-Dihydroxydibenzofuran
3,6-Dihydroxydibenzothiophene
2,7-Dihydroxycarbazole.

Bisphenol A is often preferred for reasons of availability and particular suitability for the purposes of the invention.

The cyclic oligomers have degrees of polymerization from 2 to about 30. Cyclic oligomer mixtures are preferred, especially those in which the molecular species have varying degrees of polymerization up to about 20, with a major proportion being up to about 12 and a still larger proportion up to about 15. Such mixtures have relatively low melting points as compared to single compounds such as the corresponding cyclic trimer. The cyclic oligomer mixtures are generally liquid at temperatures above 300° C., most often at temperatures above 225° C. and frequently above 200° C.

The cyclic oligomer mixtures contain very low proportions (if any) of linear oligomers. In general, no more than about 10% by weight, and most often no more than about 5%, of such linear oligomers are present. The mixtures also usually contain low percentages, if any (frequently less than 30% and preferably no higher than about 20%) of polymers (linear or cyclic) having a degree of polymerization greater than about 30. Such polymers are frequently identified hereinafter as "high polyner". These properties, coupled with the relatively low melting points and viscosities of the cyclic oligomer mixtures, contribute to their utility as resin precursors, especially for high molecular weight resins, as described hereinafter.

Suitable cyclic oligomer mixtures may be prepared by a condensation reaction involving at least one compound selected from the group consisting of bishaloformates and thiol analogs thereof, said compounds having the formula $$R(OCOX)_2 \qquad (IV)$$

or a mixture thereof with at least one dihydroxy compound having formula III, wherein R is as defined hereinabove and X is chlorine or bromine. (The compound of formula IV or mixture thereof with that of formula III is frequently referred to hereinafter as "bishaloformate composition" or "bischloroformate composition".) The condensation reaction typically takes place interfacially when a solution of said compound in a substantially non-polar organic liquid is contacted with a tertiary amine from a specific class and an aqueous alkali metal hydroxide solution.

In addition to compounds of formula IV and, optionally, formula III, the bishaloformate composition may also contain other compounds, including oligomers of the formula

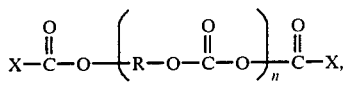

$$X-\overset{O}{\overset{\|}{C}}-O-\left(R-O-\overset{O}{\overset{\|}{C}}-O\right)_{n}-\overset{O}{\overset{\|}{C}}-X, \quad (V)$$

wherein R and X are as previously defined and n is a small number, typically about 1–4.

While the X values in formula IV may be chlorine or bromine, the bischloroformates, in which X is chlorine, are most readily available and their use is therefore preferred. (Frequent reference to bischloroformates will be made hereinafter, but it should be understood that other bishaloformates may be substituted therefor as appropriate.) Suitable dihydroxy compounds of formula III include those having divalent radicals of formula I which are different from the corresponding divalent radicals in the compound of formula IV. When such dihydroxy compounds are present, they generally comprise up to about 50%, most often up to about 20% and preferably up to about 10%, of the bischlroformate mixture. Most preferably, however, said mixture consists essentially of bischloroformates.

The tertiary amines useful in the oligomer formation reaction ("tertiary" in this context denoting the absence of N-H bonds) generally comprise those which are oleophilic; i.e., which are soluble in and highly active in organic media, especially those used in the oligomer preparation method, and in particular those which are useful for the formation of polycarbonates. Reference is made, for example, to the tertiary amines disclosed in U.S. Pat. Nos. 4,217,438 and 4,368,315, the disclosures of which are incorporated by reference herein. They include aliphatic amines such as triethylamine, tri-n-propylamine, diethyl-n-propylamine and tri-n-butylamine and highly nucleophilic heterocyclic amines such as 4-dimethylaminopyridine (which, for the purposes of this invention, contains only one active amine group). The preferred amines are those which dissolve preferentially in the organic phase of the reaction system; that is, for which the organic-aqueous partition coefficient is greater than 1. This is true because intimate contact between the amine and bischloroformate composition is essential for the formation of the cyclic oligomer mixture. For the most part, such amines contain at least about 6 and preferably about 6–14 carbon atoms.

The most useful amines are trialkylamines containing no branching on the carbon atoms in the 1- and 2- positions. Especially preferred are tri-n-alkylamines in which the alkyl groups contain up to about 4 carbon atoms. Triethylamine is most preferred by reason of its particular availability, low cost, and effectiveness in the preparation of products containing low percentages of linear oligomers and high polymers.

Also employed in the oligomer formation reaction is an aqueous alkali metal hydroxide solution. It is most often lithium, sodium or potassium hydroxide, with sodium hydroxide being preferred because of its availability and relatively low cost. The concentration of said solution is about 0.2–10M and preferably no higher than about 3M.

The fourth essential component in the cyclic oligomer preparation method is a substantially non-polar organic liquid which forms a two-phase system with water. The identity of the liquid is not critical, provided it possesses the stated properties. Illustrative liquids are aromatic hydrocarbons such as toluene and xylene; substituted aromatic hydrocarbons such as chlorobenzene, o-dichlorobenzene and nitrobenzene; chlorinated aliphatic hydrocarbons such as chloroform and methylene chloride; and mixtures of the foregoing with ethers such as tetrahydrofuran.

To prepare the cyclic oligomer mixture according to the above-described method, in the first step the reagents and components are placed in contact under conditions wherein the bischloroformate composition is present in high dilution, or equivalent conditions. Actual high dilution conditions, requiring a large proportion of organic liquid, may be employed but are usually not preferred for cost and convenience reasons. Instead, simulated high dilution conditions known to those skilled in the art may be employed. For example, in one embodiment of the method the bischloroformate composition or a mixture thereof with the amine is added gradually to a mixture of the other materials. It is within the scope of this embodiment to incorporate the amine in the mixture to which the bischloroformate is added, or to add it gradually, either in admixture therewith or separately. Continuous or incremental addition of amine is frequently preferred, whereupon the cyclic oligomer mixture is obtained in relatively pure form and in high yield.

Although addition of bischloroformate composition neat (i.e., without solvents) is within the scope of this embodiment, it is frequently inconvenient because many bischloroformates are solids. Therefore, it is preferably added as a solution in a portion of the organic liquid, especially when it consists essentially of bischloroformate. The proportion of organic liquid used for this purpose is not critical; about 25–75% by weight, and especially about 40–60%, is preferred.

The reaction temperature is generally in the range of about 0–50° C. It is most often about 0–40° C. and preferably 20–40° C.

For maximization of the yield and purity of cyclic oligomers as opposed to polymer and insoluble and/or intractable by-products, it is preferred to use not more than about 0.7 mole of bischloroformate composition (calculated as bisphenol bischloroformate) per liter of organic liquid present in the reaction system, including any liquid used to dissolve said composition. Preferably, about 0.003–0.6 mole thereof is used when it consists entirely of bischloroformate, and no more than about 0.5 mole is used when it is a mixture of compounds of formulas III and IV. It should be noted that this is not a molar concentration in the organic liquid when the bischloroformate composition is added gradually, since said composition is consumed as it is added to the reaction system.

The molar proportions of the reagents constitute another important feature for yield and purity maximization. The preferred molar ratio of amine to bischloroformate composition (calculated as bisphenol bischloroformate) is about 0.1–1.0:1 and most often about 0.2–0.6:1. The preferred molar ratio of alkali metal hydroxide to said composition is about 1.5–3:1 and most often about 2–3:1.

In a second step, the oligomer mixture may be separated from at least a portion of the polymer and insoluble material present. When other reagents are added to the alkali metal hydroxide solution and the preferred conditions and material proportions are otherwise employed, the cyclic oligomer mixture (obtained as a solution in the organic liquid) typically contains less than 30% by weight and frequently less than about 20% of polymer and insoluble material. When all of the preferred conditions are employed, the product may contain 10% or even less of such material. Depending on the intended use of the cyclic oligomer mixture, the separation step may then be unnecessary.

Therefore, a highly preferred method for preparing the cyclic oligomer mixture comprises the single step of conducting the reaction using at least one aliphatic or heterocyclic tertiary amine which, under the reaction conditions, dissolves preferentially in the organic phase of the reaction system, and gradually adding all the reagents simultaneously to a substantially non-polar organic liquid or a mixture of said liquid with water, said liquid or mixture being maintained at a temperature in the range of about 0-50° C.; the amount of bischloroformate composition used being up to about 0.7 mole for each liter of said organic liquid present in the reaction system, and the molar proportions of amine and alkali metal hydroxide to bischloroformate composition being approximately 0.2-1.0:1 and 2-3:1, respectively; and recovering the cyclic oligomers thus formed As in the embodiment previously described, another portion of said liquid may serve as a solvent for the bischloroformate composition. Addition of each reagent is preferably continuous, but may be incremental for any or all of said reagents.

Among the principal advantages of this preferred embodiment are the non-criticality of the degree of dilution of the reagents and the ability to complete the addition and reaction in a relatively short time, regardless of reaction scale. It ordinarily takes only about 25-30 minutes to complete cyclic oligomer preparation by this method, and the cyclic oligomer yield may be 85-90% or more. The crude product usually also contains only minor amounts of high molecular weight linear polycarbonates as by-products. By contrast, use of a less preferred embodiment may, depending on reaction scale, require an addition period as long as 8-10 hours and the crude product may contain substantial proportions of linear by-products with molecular weights of about 4,000-10,000, which, if not removed, may interfere with subsequent polymerization of the cyclic oligomers by acting as chain transfer agents.

It is believed that the advantageous results obtained by employing the preferred embodiment are a result of the relatively low pH of the reaction mixture, typically about 9-10. When bischloroformate composition (and optionally amine) is added to alkali metal hydroxide, on the other hand, the initial pH is on the order of 14.

When the polymer separation step is necessary, the unwanted impurities may be removed in the necessary amounts by conventional operations such as combining the solution with a non-solvent for said impurities. Illustrative non-solvents include ketones such as acetone and methyl isobutyl ketone and esters such as methyl acetate and ethyl acetate. Acetone is a particularly preferred non-solvent.

Recovery of the cyclic oligomers normally means merely separating the same from diluent (by known methods such as vacuum evaporation) and, optionally, from high polymer and other impurities. As previously suggested, the degree of sophistication of recovery will depend on such variables as the intended end use of the product.

The preparation of cyclic oligomer mixtures useful in this invention is illustrated by the following examples. All parts and percentages in the examples herein are by weight unless otherwise indicated. Temperatures are in degrees Celsius. Molecular weights, whenever referred to herein, are weight average unless otherwise indicated and were determined by gel permeation chromatography relative to polystyrene.

EXAMPLE 1

The crude bischloroformate composition used was a bisphenol A bischloroformate composition corresponding roughly to the dimer.

A 300-ml. Morton flask was charged with 128 ml. of methylene chloride, 10 ml. of water, 2 ml. of 4.9M aqueous sodium hydroxide, 1.16 ml. of triethylamine and 5 ml. of 0.66M aqueous disodium salt of bisphenol A. The mixture was heated under reflux, with stirring, as 40 ml. of a 1.06 M solution of the bischloroformate in methylene chloride was a over 37 minutes. There were concurrently added an additional 35 ml. of the bisphenol A disodium salt solution over 32 minutes, 10 ml. of sodium hydroxide solution over 30 minutes, and 0.36 ml. of triethylamine in 10 equal increments 3-$\frac{1}{2}$ minutes apart. Stirring was continued for several minutes, after which the aqueous and organic phases were separated and the aqueous layer was washed with methylene chloride. The combined organic phases were washed once with dilute aqueous sodium hydroxide, twice with aqueous hydrochloric acid, once again with sodium hydroxide and twice with water, and dried over magnesium sulfate. Upon filtration, vacuum stripping and drying in an oven, there was obtained a white solid comprising the desired cyclic oligomer mixture, containing about 89% cyclic oligomers.

EXAMPLE 2

A solution of 1.4 mmol. of bisphenol A bischloroformate and 0.6 mmol. of 1,4-benzenedimethanol bischloroformate in 10 ml. of a tetrahydrofuran-methylene chloride solution comprising 10% by volume tetrahydrofuran was added over 30 minutes at 30° C., with stirring, to a mixture of 10 ml. of methylene chloride, 2 ml. of 2.5M aqueous sodium hydroxide and 1 mmol. of triethylamine. After addition was complete, the mixture was washed three times with dilute aqueous hydrochloric acid and the organic layer was separated, dried by filtration through phase separation paper and evaporated under vacuum. The product was the desired mixed cyclic polycarbonate oligomer of bisphenol A and benzene1,4-dimethanol.

EXAMPLES 3-12

Following the procedure of Example 2, products containing at least about 80% mixed cyclic polycarbonate oligomers were prepared from mixtures of bisphenol A bischloroformate and the dihydroxy compounds listed in Table I. In each case, a total of 2 mmol. of bischloroformate composition was used. The proportion of the listed dihydroxy compound therein was 10 mole percent unless otherwise indicated.

TABLE I

| Example | Dihydroxy compound |
|---|---|
| 3 | 1,1-Bis(4-hydroxyphenyl)cyclohexane |
| 4 | 1,1-Bis(4-hydroxyphenyl)cyclododecane |
| 5 | 2,2-Bis(3,5-dimethyl-4-hydroxyphenyl)propane |
| 6 | 2,2-Bis(3,5-dibromo-4-hydroxyphenyl)propane |
| 7 | 2,2-Bis(4-hydroxyphenyl)-1,1-dichloroethylene |
| 8 | Hydroquinone |
| 9 | Hydroquinone (15 mole percent) |
| 10 | Bis(4-hydroxyphenyl) sulfide |
| 11 | Bis(4-hydroxyphenyl) sulfone |

TABLE I-continued

| Example | Dihydroxy compound |
|---------|-------------------|
| 12 | Bis(3,5-dimethyl-4-hydroxyphenyl) sulfone |

The present invention is based on the use as a polycarbonate formation catalyst of a polymer containing alkali metal phenoxide moieties. Said moieties (hereinafter sometimes designated "phenoxide moieties" for brevity) may be present in the polymer chain, as illustrated, for example, by novolak resins. They may also be present as substituents on the polymer chain, as illustrated by vinylphenol polymers.

Most often, however, the phenoxide moieties are present as end groups. Numerous polymers containing such end groups are known; they include polyphenylene ethers, polyformals, polyethersulfones, polyetherketones, polyimides, polyarylates and polycarbonates. By reason of their inherent compatibility with cyclic polycarbonate oligomers, the preferred polymers are polycarbonates and especially polycarbonates containing moieties identical to those in the cyclics.

The phenoxide moieties may be produced by simple neutralization of phenolic groups in the polymer with an alkali metal base. Any alkali metal is suitable, with lithium, sodium and potassium being most commonly used for obvious reasons of availability. Lithium is often preferred by reason of the relative stability of lithium-containing polycarbonate systems. Likewise, the anion of the base may be any suitable anion such as hydroxide, hydride, amide or phenoxide, especially the latter.

The reaction of the polymer with the alkali metal base is typically conducted at a temperature in the range of about 200–300° C., employing about 0.2–1.0 moles and preferably about 0.5–0.8 moles of base per mole of polymer, calculated from number average molecular weight. The reactions which take place may include neutralization of any terminal phenolic groups present. However, many polycarbonates are prepared using phenols or the like as chain terminating agents and therefore have no such terminal phenolic groups. A more certain source of phenoxide moieties in such situations is cleavage of the polycarbonate chain by nucleophilic attack of the alkali metal phenoxide on a carbonate group therein, producing a phenoxide moiety-terminated polycarbonate of lower molecular weight. The molecular weight degradation which occurs is not detrimental for the purposes of this invention. Typical final number average molecular weights for the phenoxide moiety-terminated polycarbonates are in the range of about 8,000–20,000. (All molecular weights herein are determined by gel permeation chromatography relative to polystyrene.)

Polymerization of the cyclic oligomer composition is typically effected by simply contacting said composition with the catalyst at temperatures up to 350° C., preferably about 200–300° C., until polymerization has proceeded to the extent desired. Although the use of a solvent is within the scope of the invention, it is not required and is frequently not preferred. In general, the amount of catalyst used is about 0.001–1.0 mole percent based on structural units in the oligomer mixture.

The phenoxide moiety-containing catalysts are particularly useful in pultrusion processes. Accordingly, another aspect of the invention is a method in which said catalyst is deposited as a coating on a continuous fiber reinforcing material such as carbon, glass, highly oriented polyamide or boron fibers, which is subsequently contacted with the cyclic oligomer composition under the previously described polymerization conditions. Most often, the catalyst-coated fiber is drawn through the liquid cyclic oligomer composition at a temperature below that of polymerization, and the oligomer-coated fiber thus produced is drawn through a heating zone in which polymerization occurs.

It is also possible to modify the catalytic effect of the phenoxide moiety-containing catalysts by treatment with catalyst modifiers such as Lewis acids. Boron- and aluminum-containing Lewis acids, and especially triphenylborane and triphenyl borate, are preferred for this purpose. The use of such Lewis acids is disclosed and claimed in copending, commonly owned application Ser. No. 924,713, filed Oct. 30, 1986.

The precise proportion of Lewis acid to be used will depend on various interdependent circumstances including the chemical properties of the particular oligomer composition used, the prevailing conditions of processing and polymerization and whether it is desied to accelerate or inhibit polymerization. For example, a factor of importance is the presence or absence of a solvent during polymerization. When a non-polar solvent such as 2,4-dichlorotoluene or 1,2,4-trichlorobenzene is present, use of the Lewis acid at molar ratios as low as 1.5 1 can cause substantial inhibition at 200° C. For melt polymerization, higher molar ratios may be required under certain circumstances. This is believed to be attributable in part to the relatively high polarity of melt systems as opposed to those employing non-polar solvents, which promotes greater ionic dissociation and hence greater activity of the catalyst, and in part to the higher effective catalyst concentration in a solvent-free system.

Still another relevant factor under certain conditions is the method of incorporation of the catalyst and Lewis acid in the material to be polymerized. Thus, for solution polymerization the employment of Lewis acid in a molar ratio to catalyst up to 1:1 generally causes mild acceleration of polymerization. For melt polymerization, simple incorporation of Lewis acid and catalyst in a 1:1 ratio in the cyclics composition usually has little if any effect, but ratios above about 2:1 are inhibitory. However, inhibition in melt systems is found at ratios of 1:1 or higher when an initial step of intimately blending the catalyst and the Lewis acid, typically by dissolution in a common solvent such as methylene chloride followed by evaporation of the solvent, is employed.

The preparation of polymers containing alkali metal phenoxide moieties and their use as polycarbonate formation catalysts are illustrated by the following examples.

EXAMPLE 13

A mixture of 50 parts of a bisphenol A polycarbonate having a number average molecular weight of about 15,600 and 0.2 part of lithium phenoxide was heated under nitrogen for 30 minutes in a Helicone vertical mixer. There was obtained the desired lithium phenoxide-terminated polycarbonate having a number average molecular weight of about 10,700.

EXAMPLE 14

A mixture of 2 grams of a cyclic bisphenol A polycarbonate oligomer mixture similar to that of Example 1, 98.4 mg. of the product of Example 13 and 50 ml. of methylene chloride was vacuum stripped and dried for 2 hours under nitrogen at 110° C. A 500-mg. sample thereof was heated for 15 minutes under nitrogen at 250° C. There was obtained a linear bisphenol A polycarbonate having a number average molecular weight of about 34,400. Polymerization was essentially complete. In a control experiment utilizing an equivalent amount of a lithium phenoxide catalyst, only 11% polymerization was noted.

EXAMPLE 15

Example 15 simulates a pultrusion operation in which phenoxide moiety-containing catalyst is coated on glass which is then coated with cyclics and heated to polymerization temperature.

Various polycarbonate formation catalysts were dissolved in water (lithium hydroxide and lithium phenoxide) or methylene chloride (tetra-n-butylammonium tetraphenylborate and the product of Example 13). The solutions were poured into a glass dish and the solvent was evaporated, forming a catalyst coating on the dish. One gram of a cyclic bisphenol A polycarbonate oligomer mixture similar to that of Example 1 was added to each dish, affording a 0.1 mole percent catalyst concentration based on structural units in the oligomer, and the dishes were heated at 300° C. for 30 minutes. The products were dissolved in methylene chloride and the degree of polymerization was determined by gel permeation chromatography. The following results were obtained.

| Catalyst | % polymer |
|---|---|
| None | 40 |
| Ex. 13 | 100 |
| Lithium hydroxide | 65 |
| Lithium phenoxide | 75 |
| Tetra-n-butylammonium tetraphenylborate | 35 |

These results show the improved effectiveness of the lithium phenoxide-terminated polycarbonates, as compared with other polycarbonate formation catalysts, under simulated pultrusion conditions. It also demonstrates the relative ineffectiveness under such conditions of the normally active tetra-n-butylammonium tetraphenylborate, probably as a result of degradation.

EXAMPLE 16

A mixture of cyclics and initiator similar to that of Example 14, but also containing 1.1 mg. of triphenyl borate, was prepared and samples were heated for 5 minutes at 250° and 300° C. No polymerization was noted at 250° C. At ° C., however, complete polymerization was observed.

What is claimed is:

1. A method for preparing a resinous composition which comprises contacting, at a temperature in the range of about 200°-350° C., at least one cyclic polycarbonate oligomer with a catalyst comprising a polymer containing alkali metal phenoxide moieties.

2. A method according to claim 1 wherein the cyclic polycarbonate oligomer composition is a mixture of oligomers having varying degrees of polymerization and comprising structural units having the formula $$-O-R-O-\overset{O}{\underset{\|}{C}}-, \qquad (I)$$

at least about 60% of the total number of R values are aromatic organic radicals and the balance thereof are aliphatic, alicyclic or aromatic organic radicals.

3. A method according to claim 2 wherein the catalyst polymer is a linear polycarbonate.

4. A method according to claim 3 wherein each R value has the formula $$-A^1-Y-A^2-, \qquad (II)$$

wherein each of $A^1$ and $A^2$ is a monocyclic divalent aromatic radical and Y is a bridging radical in which one or two carbon atoms separate $A^1$ from $A^2$.

5. A method according to claim 4 wherein the catalyst polymer has a number average molecular weight in the range of about 8,000-20,000.

6. A method according to claim 5 wherein the alkali metal is lithium.

7. A method according to claim 6 wherein each of $A^1$ and $A^2$ is p-phenylene and Y is isopropylidene.

8. A method according to claim 5 wherein the catalyst is prepared by heating said linear polycarbonate with an alkali metal phenoxide at a temperature in the range of about 200°-300° C.

9. A method according to claim 8 wherein the alkali metal is lithium.

10. A method according to claim 9 wherein each of $A^1$ and $A^2$ is p-phenylene and Y is isopropylidene.

11. A method according to claim 4 wherein the catalyst polymer has been treated with a boron- or aluminum-containing Lewis acid.

12. A method according to claim 11 wherein the Lewis acid is triphenylborane or triphenyl borate.

13. A method according to claim 12 wherein the alkali metal is lithium.

14. A method according to claim 4 wherein the catalyst is deposited as a coating on a continuous fiber reinforcing material which is subsequently contacted with said cyclic polycarbonate oligomer composition.

15. A method according to claim 14 wherein the catalyst polymer has a number average molecular weight in the range of about 8,000-20,000.

16. A method according to claim 15 wherein the alkali metal is lithium.

17. A method according to claim 16 wherein each of $A^1$ and $A^2$ is p-phenylene and Y is isopropylidene.

18. A method according to claim 15 wherein the catalyst is prepared by heating said linear polycarbonate with an alkali metal phenoxide at a temperature in the range of about 200°-300° C.

19. A method according to claim 18 wherein the alkali metal is lithium.

20. A method according to claim 19 wherein each of $A^1$ and $A^2$ is p-phenylene and Y is isopropylidene.

* * * * *